United States Patent [19]

Affleck et al.

[11] Patent Number: 4,868,841
[45] Date of Patent: Sep. 19, 1989

[54] DIRECTLY HEATED CERAMIC CATALYST SUPPORT

[75] Inventors: Wayde H. Affleck, El Segundo; Thomas P. Moser, Redondo Beach, both of Calif.

[73] Assignee: Hughes Aircraft Company, Los Angeles, Calif.

[21] Appl. No.: 205,963

[22] Filed: Jun. 13, 1988

[51] Int. Cl.[4] .............................................. H01S 3/22
[52] U.S. Cl. ....................................... 372/59; 372/34; 372/61
[58] Field of Search ........................ 372/59, 34, 33, 161

[56] References Cited

U.S. PATENT DOCUMENTS

| 4,387,462 | 6/1983 | Markus | 372/33 |
| 4,547,886 | 10/1985 | Kaminski et al. | 372/59 |
| 4,651,324 | 3/1987 | Prein et al. | 372/59 |

FOREIGN PATENT DOCUMENTS

| 0062790 | 5/1980 | Japan | 372/59 |
| 1256398 | 12/1971 | United Kingdom | 372/59 |
| 2028571 | 3/1980 | United Kingdom | 378/59 |
| 2083944 | 3/1982 | United Kingdom | 372/59 |

OTHER PUBLICATIONS

Sorem et al., "Catalytic Converters for Closed-Cycle Operation of Isotopic $CO_2$ TEA Lasers", Rev. Sci. Instrum. 52(8), Aug. 81, p. 1183.

Harns, Stark; "Platinum-Catalysed Recombination of CO and $O_2$ in Sealed $CO_2$ TEA Laser Gases", J. Phys. E. Sci. Inst., vol. 11, 1978.

Primary Examiner—Léon Scott, Jr.
Attorney, Agent, or Firm—W. J. Streeter; M. J. Meltzer

[57] ABSTRACT

A directly heated catalyst 10 is comprised of an electrically conductive ceramic substrate 12 having a catalytic coating 14 applied to at least an outer surface thereof. In an illustrative embodiment of the invention the catalytic coating is a noble metal or non-noblemetal coating. In accordance with one embodiment of the invention a high surface area form of platinum (Platinum Black) is deposited upon a ceramic substrate, such as a substrate comprised of SiC or $SnO_2$. The coating is brought to its activation temperature by resistively heating the substrate with an electrical current. A temperature sensing device (20, 40), such as a thermocouple or a thermostat, may be coupled to the catalyst structure for sensing the temperature of the catalyst to control the heater current supplied to the substrate. The catalyst is shown to be useful for $CO_2$ gas lasers.

30 Claims, 2 Drawing Sheets

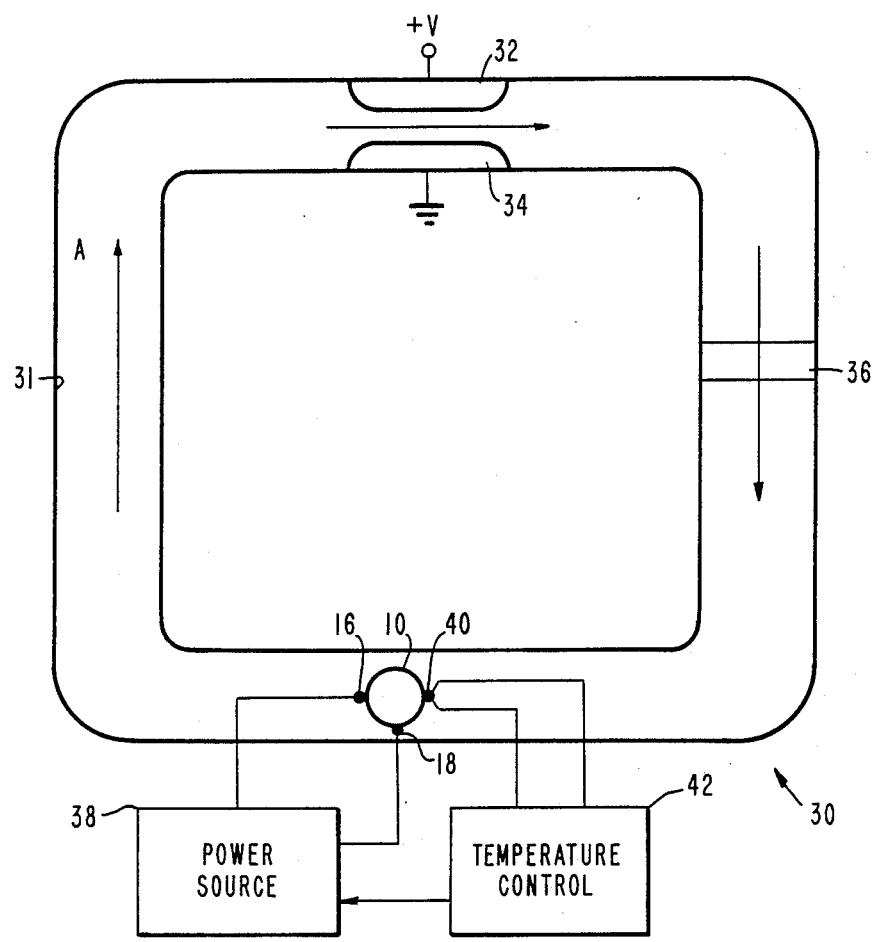

DIRECTLY HEATED CERAMIC CATALYST SUPPORT

FIELD OF THE INVENTION:

This invention relates generally to catalysts and, in particular, relates to a catalyst for reconstituting $CO_2$, the catalyst comprising a catalytic material, such as a noble metal, deposited upon a directly heated ceramic substrate.

BACKGROUND OF THE INVENTION $CO_2$ lasers typically contain a mixture of gases such as carbon dioxide, nitrogen and other gases An electrical discharge between a pair of electrodes within the laser cavity induces the lasing of the $CO_2$ and also dissociates the $CO_2$ into CO and $O_2$. This dissociation of $CO_2$ tends to reduce the volume of the $CO_2$ within the laser, resulting in the gradual decrease in the output power of the laser and, possibly, in the complete failure of the laser after a period of time In order to replenish the $CO_2$ it has been known to provide an external gas canister of $CO_2$. However, in some applications, such as military applications, such an external gas canister may be undesirable.

It has also been known to provide a catalyst within the laser cavity to recombine the dissociated CO and $O_2$ inasmuch as CO and $O_2$ do not readily recombine at room temperatures or at typical laser operating temperatures. A variety of catalysts have been known which promote this reconstitution of $CO_2$ from CO and $O_2$. An example of such a catalyst is metallic platinum (Pt) in wire form which is resistively heated to a temperature of about 1000° C. It has also been known to recombine CO and $O_2$ by pumping the laser gas through a bed of hopcalite (60% $MnO_2$, 40% CuO, and trace quantities of other oxides), the hopcalite typically being provided in granular or powder form. However, a significant pressure drop may occur within such a bed of hopcalite if it is required that the laser gas be pumped through the bed. Also, hopcalite often requires periodic treatment in order to maintain its activity and must also be suitably contained such that the powder does not contaminate the inner surface of the laser cavity.

In a metallic platinum catalyst it is known that the number of $CO_2$ and $O_2$ molecules that are recombined to $CO_2$ during a given interval of time is directly related to the surface area of the catalyst in contact with the molecules and, also, is exponentially related to the temperature of the platinum Thus, an increase in the surface area results in a significant decrease in the temperature required to accomplish a desired $CO_2$ recombination rate.

Conventional methods of heating catalysts include upstream heating of the laser gas and direct thermal contact of the catalyst structure with an embedded heating element. The upstream heating of laser gas may be undesirable in some applications due to subsequent heat removal operations possible, inefficiency in heat transfer, and possible structural complexity and increased cost. Direct thermal contact of the catalyst structure with an embedded heating element may also prove disadvantageous due to inefficient thermal transport between the element and the catalytic structure and the difficulty in implementing this technique in a compact geometry.

It is therefore an object of the invention to provide a catalytic structure which employs a coating comprised of a catalytic material deposited upon an electrically conductive ceramic substrate, the substrate being resistively heated in order to elevate the catalytic coating to its activation temperature.

It is a still further object of the invention to provide a catalyst for a $CO_2$ laser having a high catalytic activity per unit volume at a reduced operating temperature or a minimum power requirement, the catalyst having a resistively heated substrate for elevating a catalytic coating to a desired temperature.

One further object of the invention to provide a catalyst for a $CO_2$ laser having a high catalytic activity per unit volume at a reduced operating temperature or input power requirement, the catalyst having a resistively heated ceramic substrate for elevating a catalytic coating to a desired temperature, the catalyst further having a temperature control coupled thereto for maintaining the coating at the desired temperature.

SUMMARY OF THE INVENTION

The foregoing problems are overcome and other advantages are realized by a catalytic structure which is comprised of a coating of a catalytic material deposited upon a surface of an electrically conductive ceramic substrate. In one illustrative embodiment of the invention a high surface area form of platinum (Platinum Black) is deposited upon an electrically conductive ceramic substrate. The substrate is resistively heated by an electrical current thereby elevating the platinum coating to its activation temperature. Gas is flowed over the catalyst which, due to the high platinum surface area provided by the Platinum Black coating, achieves a high catalytic activity with a moderate degree of heating. The substrate may be any electrically conductive ceramic material such as silicon carbide or tin oxide.

In accordance with the invention the ceramic catalyst support may also be used to provide a temperature sensing means for indicating the temperature of the catalytic coating by noting the resistance of the support. The temperature sensing means may further be coupled to a current controlling means for controlling the amount of heater current through the substrate.

In accordance with the invention there is also disclosed a flowing gas laser, comprising means for containing a flow of gas, the gas comprising $CO_2$; means for flowing the gas through the containing means; means for energizing the $CO_2$ for causing the $CO_2$ to emit laser radiation, the energizing means disassociating some of the $CO_2$ gas into CO and $O_2$. The laser further comprises a directly heated catalyst for catalyzing the recombination of the CO and $O_2$ into $CO_2$, the catalyst comprising: an electrically conducting ceramic substrate having an electrical resistance associated therewith; a coating comprised of a catalytic material overlying and thermally coupled to the substrate, the coating being operable for catalyzing, at a predetermined activation temperature, the recombination of CO and $O_2$ into $CO_2$, the catalyst being disposed within the flow of the gas; and means for supplying current to the substrate for resistively heating the substrate whereby the coating is heated to the predetermined activation temperature.

Further in accordance with the invention there is disclosed a method of fabricating a catalytic structure, comprising the steps of providing a substrate having a desired shape, the substrate comprising an electrically conductive ceramic; and forming a coating over the substrate, the coating being comprised of a catalytic material.

BRIEF DESCRIPTION OF THE DRAWINGS

These and other aspects of the present invention will become more apparent in conjunction with the ensuing detailed description of the invention read in conjunction with the accompanying drawing wherein:

FIG. 1 shows, in accordance with one embodiment of the invention, a catalytic structure comprised of a layer of catalytic material, such as a noble metal, deposited upon a surface of an electrically conducting ceramic substrate;

FIG. 2 shows a block diagram of a flowing gas $CO_2$ laser having, in accordance with the invention, a directly heated catalyst for promoting the recombination of CO and $O_2$ into $CO_2$.

DETAILED DESCRIPTION OF THE INVENTION

Figure 3:
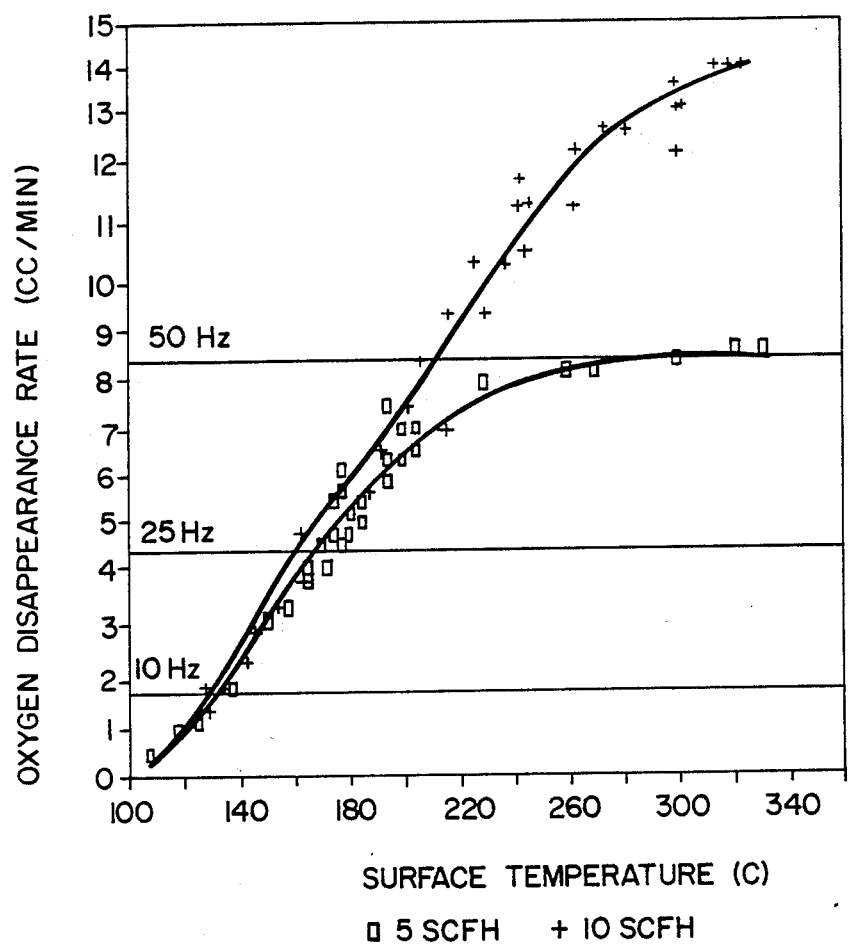
FIG. 3 is a graph which plots oxygen recombination rate versus temperature for a catalytic structure constructed in accordance with FIG. 1, the graph being plotted for two gas flow rates.

Referring now to FIG. 1 there is shown a side view of a catalyst constructed in accordance with the invention. Catalyst 10 can be seen to be comprised of a substantially circular cylindrical substrate 12 having a coating 14 comprised of a catalytic material operable for catalyzing the recombination of CO and $O_2$ into $CO_2$. Substrate 12 is preferably comprised of an electrically conductive ceramic, such as silicon carbide (SiC), tin oxide ($SnO_2$) or any suitable ceramic material which has a sufficient degree of electrical conductivity whereby the substrate may be resistively heated. The coating 14 comprises a catalytic material, such as a noble metal, which in a preferred embodiment of the invention comprises a coating of a high surface area form of platinum such as Platinum Black. Platinum Black is a finely divided form of metallic platinum which typically is derived from a reduction of a solution of a platinum salt with zinc or magnesium. In general, it has the form of a black powder, is soluble in aqua regia and has a specific gravity of 15.8 to 17.6 (apparent). The layer 14 of Platinum Black may be deposited upon the surface of the substrate 12 by immersing the substrate 12 within an electroplating solution of Platinum Black and thereafter applying a current to the substrate 12. The current causes the electrodeposition of the Platinum Black upon the substrate Prior to use the catalyst structure is preferably conditioned by being placed in an atmosphere of helium, the structure being heated to a temperature of about 350° C.

The substrate may also have a pair of electrical terminals 16 and 18 for electrically coupling the substrate 12 to a source of heater power, such as alternating or direct current. There may also be provided a heat control means such as a heat sensor or thermostat 20 which is thermally coupled to the substrate 12 and which also comprises terminals 22 and 24 for coupling the thermostat 20 to a suitable temperature controller.

Of course, the invention may be practiced by other catalytic substances deposited upon the substrate, such as by depositing a layer of palladium (Pd). In general any catalytic substance, including noble metals and other substances, may be employed so long as the catalytic material is amenable to being deposited as a layer or coating upon the substrate 12. Examples of non-noble metal catalytic substances include manganese, magnesium, nickel and copper. Also, the coating may be formed by other than electrodeposition. For example, the ceramic material of the substrate 12 may be impregnated with the catalytic substance. This impregnation may be accomplished by a number of known techniques. For example, an insipient wetness technique may be employed, especially with a relatively porous substrate such as tin oxide, wherein the voids within the porous substrate are filled with a saturated solution of catalytic material, the liquid portion thereafter being evaporated. Also, a precipitation and baking technique may be employed to form the coating.

The electrical conductivity of substrate 12 is determined such that the substrate may be resistively heated to a temperature where the activation of the catalytic layer 14 is achieved. For example, if the substrate is coated with Platinum Black a temperature within the range of about 100° C. to about 350° C. may be sufficient.

The overall shape of the catalytic structure 10 is determined such that a large surface area of the catalytic material is presented to a gas flow passing over and through the catalytic structure. As can be appreciated, the greater the catalytic surface area in contact with the flowing gas stream the greater will be the rate of recombination of CO and $O_2$ to $CO_2$. The actual shape and dimensions of a particular catalytic structure is typically application dependent and may be varied within a wide range while yet achieving the beneficial results made possible by the invention. Thus, it can be appreciated that the circular cylindrical helical shape illustrated in FIG. 1 is but one suitable shape for a catalytic structure constructed in accordance with the invention.

Referring now to FIG. 2 there is shown an illustrative pulsed, flowing gas $CO_2$ laser 30 having the catalyst 10 of FIG. 1 disposed within a gas flow path, indicated by the arrow designated as A, contained within a gas conduit 31. Laser 30 comprises a pair of electrodes 32 and 34 disposed opposite one another across the gas flow path A and defining a discharge region therebetween. A pulsed source of high voltage (indicated by V+ and ground) or other form of discharge energy is coupled to the electrodes for inducing a discharge, the discharge causing the flowing $CO_2$ within the discharge region to lase. Pulses of laser radiation are coupled from the laser 30 by a suitable output coupling means (not shown). A gas flow means, such as a fan 36, is also typically disposed within the conduit 31 for circulating the laser gas at a rate sufficient to replenish, before each discharge, the gas within the discharge region.

As has been previously stated, each discharge disassociates some of the $CO_2$ into CO and $O_2$. If the CO and $O_2$ are not recombined a gradual decrease in laser pulse power will occur, leading to the eventual failure of the laser. The catalyst 10 is provided, therefore, to recombine the CO and $O_2$ gases to ensure the continued operation of the laser 30 at a desired pulse power and pulse repetition rate.

In accordance with the invention, the catalyst 10 is provided with a power source 38 coupled to the terminals 16 and 18 for directly heating the substrate 12 whereby the catalytic layer 14 is heated to a desired activation temperature. Power source 38 may be any suitable source, such as an AC or DC current source, which is operable for providing sufficient current flow through the resistance of the substrate 12 to elevate and maintain the temperature of the noble metal layer 14 at a desired temperature.

If desired, the invention also advantageously provides for coupling a heat control means such as a thermocouple 40 and a temperature controller 42 to the catalyst 10 and to the power source 38 for maintaining the temperature of the layer 14 at a desired temperature. The temperature control means may comprise a number of well known devices which are operable for responding to a change in temperature of the catalytic structure for increasing or decreasing the current flow through the substrate 12. Thus, variations in gas flow rates over the catalyst 10, variations in laser pulse rate and other gas temperature influencing factors may be compensated for in order to maintain the catalyst at a desired temperature.

Furthermore, inasmuch as the resistance of the substrate is related to the temperature of the substrate by a known function, the resistance may be employed as a direct indication of substrate and, hence, the catalytic coating temperature. The resistance is determined by the application of Ohm's law as the ratio of voltage to current. That is, the ratio of the voltage output of power source 38 to the current provided by the power source may be determined by well known circuits to derive a signal indicative of resistance and temperature.

It can be appreciated that the directly heated catalyst of the invention may also be advantageously employed in continuous output flowing gas lasers. The invention may also be employed for other applications wherein a heated catalyst recombines disassociated gases. Thus, the invention is not limited solely for use within a laser.

Referring now to FIG. 3 there is shown a graph wherein the oxygen disappearance rate, that is the volume of molecular oxygen converted per unit time, is plotted against surface temperature of the catalyst 10 of FIG. 1. The graph shows data for two different gas flow rates. The intersection of the two curves with the horizontal operating lines for 10, 25 and 50 Hz laser operation defines the minimum operating temperature for achieving continuous operation. The leveling off of the oxygen disappearance rate at approximately 200° C. for the lower gas flow rate of 5 SCFH is believed to be related to a limitation imposed by mass transport of the reactants to the catalytic site. At the higher flow rate of 10 SCFH the oxygen disappearance rate does not exhibit such a leveling off at 200° C., indicating that for a given application it may be desirable to empirically determine a gas flow rate relative to laser pulse repetition rate and catalyst activation temperature.

A presently preferred embodiment of the invention has herein been disclosed, it being appreciated that a number of modifications to this embodiment may occur to those having skill in this art. For example, it can be realized that the helical shaped structure illustrated in FIG. 1 is but one suitable shape. Thus, the invention is not to be considered to be limited to this presently preferred embodiment but is instead only to be limited by the appended claims.

What is claimed is:

1. A catalytic apparatus for catalyzing, within a flow of gas, the combination of CO and $O_2$ into $CO_2$, comprising:
   an electrically conductive ceramic substrate; and
   a coating comprised of a catalytic material deposited upon and thermally coupled to said substrate, said coating catalyzing, the combination of CO and $O_2$ into $CO_2$ within a flow of gas in contact with said coating; and wherein
   said substrate has an electrical resistance such that an electrical current passed through said substrate resistively heats said substrate for heating said coating to a temperature which is approximately equal to an activation temperature of said coating.

2. A catalytic apparatus as defined in claim 1 and further comprising:
   means for providing electrical current to said substrate for heating said coating.

3. A catalytic apparatus as defined in claim 2 wherein said substrate has a circular cylindrical shape and further comprises a pair of electrical terminals coupled thereto for coupling said substrate to said current providing means.

4. A catalytic apparatus as defined in claim 2 wherein said catalytic apparatus further comprises a temperature sensing means thermally coupled thereto for sensing the temperature of said coating, said temperature sensing means having an output signal a magnitude of which is related to said temperature.

5. A catalytic apparatus as defined in claim 1 wherein said coating comprises Platinum Black deposited upon an outer surface of said substrate.

6. A catalytic apparatus as defined in claim 1 wherein said substrate comprises a ceramic material selected from the group consisting of SiC and $SnO_2$ and wherein said coating comprises a noble metal deposited at least upon an outer surface of said substrate.

7. A catalytic apparatus as defined in claim 1 wherein said catalytic apparatus further comprises a temperature sensing means comprising means for determining a magnitude of a voltage and a current applied to said substrate such that the resistance of the substrate is determined, the resistance being a function of temperature.

8. A directly heated catalyst for catalyzing the recombination of CO and $O_2$ into $CO_2$ in a flowing gas $CO_2$ laser, comprising:
   an electrically conductive ceramic substrate having an electrical resistance;
   a coating comprised of a catalytic material overlying and thermally coupled to said substrate, said coating catalyzing the recombination of CO and $O_2$ into $CO_2$ within a flow of laser gas in contact with said coating; and
   means for supplying current to said substrate for resistively heating said substrate whereby said coating is heated at least to an activation temperature of said coating.

9. A catalyst as defined in claim 8 and further comprising:
   means for controlling an amount of current supplied to said substrate for maintaining said coating at an elevated temperature.

10. A catalyst as defined in claim 9 wherein said substrate has a circular cylindrical shape and further comprises a pair of electrical terminals coupled thereto for coupling said substrate to said current providing means.

11. A catalyst as defined in claim 8 wherein said substrate comprises a ceramic material and wherein said coating comprises Platinum Black deposited upon an outer surface of said substrate.

12. A catalyst as defined in claim 8 wherein said substrate comprises a ceramic material selected from the group consisting of SiC and $SnO_2$ and wherein said coating comprises catalytic material deposited upon an outer surface of said substrate.

13. A catalyst as defined in claim 8 wherein said substrate comprises a ceramic material selected from a group consisting of SiC and $SnO_2$ and wherein said coating comprises a catalytic material selected from the group consisting of platinum, palladium, manganese, magnesium, nickel and copper.

14. A catalyst as defined in claim 8 wherein said catalyst further comprises a temperature sensing means thermally coupled thereto for sensing the temperature of said substrate, said temperature sensing means having an output signal the magnitude of which is related to said temperature.

15. A flowing gas laser, comprising:
means for containing a flow of gas comprising $CO_2$, at least a portion of said containing means defining a resonant cavity structure;
means for flowing said gas through said containing means;
means, coupled to said resonant cavity structure, for energizing the $CO_2$ for causing the $CO_2$ to emit laser radiation, said energizing means disassociating some of the $CO_2$ gas into CO and $O_2$;
said laser further comprising:
a directly heated catalyst for catalyzing the recombination of the CO and $O_2$ into $CO_2$, said catalyst comprising:
an electrically conducting ceramic substrate having an electrical resistance associated therewith;
a coating comprised of a catalytic material overlying and thermally coupled to said substrate, said coating catalyzing the recombination of CO and $O_2$ into $CO_2$, said catalyst being disposed within the flow of said gas; and
means for supplying current to said substrate for resistively heating said substrate whereby said coating is heated at least to its activation temperature.

16. A laser as defined in claim 15 and further comprising:
means for controlling an amount of current supplied to said substrate.

17. A laser as defined in claim 16 wherein said catalyst further comprises a temperature sensing means thermally coupled thereto for sensing the temperature of said catalyst, said temperature sensing means having an output signal a magnitude of which is related to said temperature.

18. A laser as defined in claim 15 wherein said substrate comprises a ceramic material selected from the group consisting of SiC and $SnO_2$ and wherein said coating comprises Platinum Black deposited upon an outer surface of said substrate.

19. A laser as defined in claim 15 wherein said substrate comprises a ceramic material selected from the group consisting of SiC and $SnO_2$ and wherein said coating comprises palladium deposited upon an outer surface of said substrate.

20. A laser as defined in claim 15 wherein said substrate comprises a ceramic material selected from a group consisting of SiC and $SnO_2$ and wherein said coating comprises a catalytic material selected from the group consisting of platinum, palladium, manganese, magnesium, nickel and copper.

21. A method of operating a flowing gas laser, comprising the steps of:
containing a flow of gas, the gas comprising $CO_2$;
flowing the gas through the containing means, at least a portion of the containing means defining a resonant cavity structure;
energizing the $CO_2$ within the resonant cavity structure for causing the $CO_2$ to emit laser radiation, the step of energizing disassociating some of the $CO_2$ gas into CO and $O_2$;
the method further comprising the steps of:
directly heating a catalyst for catalyzing the recombination of the CO and $O_2$ into $CO_2$, the step of directly heating the catalyst comprising the steps of:
providing an electrically conducting ceramic substrate having an electrical resistance associated therewith, the substrate being coated with a catalytic material overlying and thermally coupled to the substrate, the coating for catalyzing the recombination of CO and $O_2$ into $CO_2$, the catalyst being disposed within the gas flow; and
supplying current to the substrate for resistively heating the substrate whereby the temperature of the coating is elevated at least to an activation temperature of the coating.

22. A method as defined in claim 21 and further comprising a step of controlling an amount of current supplied to the substrate for maintaining the coating at the elevated temperature.

23. A method as defined in claim 21 wherein the step of providing a substrate provides a substrate comprised of a ceramic material selected from the group consisting of SiC and $SnO_2$.

24. A method of fabricating a catalytic structure, comprising the steps of:
providing a substrate, the substrate being comprised of an electrically conductive ceramic material; and
forming a coating upon at least an outer surface of the substrate, the coating being comprised of a material for catalyzing the recombination of $CO_2$ from CO and $O_2$ at a temperature equal to or greater than an activation temperature of the coating.

25. A method as defined in claim 24 wherein the step of forming a coating is accomplished by an electrodeposition technique.

26. A method as defined in claim 24 wherein the step of forming a coating is accomplished by an incipient wetness technique.

27. A method as defined in claim 24 wherein the step of forming a coating is accomplished by a precipitation and baking technique.

28. A method as defined in claim 24 and further comprising a step of conditioning the catalytic structure by heating the catalytic structure to a predetermined temperature while maintaining the catalytic structure in an atmosphere comprised substantially of helium.

29. A method as defined in claim 24 wherein the step of providing a substrate is accomplished by providing a substrate which comprises silicon carbide or tin oxide.

30. A method as defined in claim 24 wherein the coating comprises platinum black, palladium, manganese, magnesium, nickel or copper.

* * * * *